(12) United States Patent
Kinjo

(10) Patent No.: US 10,108,574 B2
(45) Date of Patent: Oct. 23, 2018

(54) ELECTRONIC DEVICE, COMMUNICATION CONTROL CIRCUIT, AND COMMUNICATION CONTROL METHOD

(71) Applicant: FUJITSU LIMITED, Kawasaki-shi, Kanagawa (JP)

(72) Inventor: Tsukasa Kinjo, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 574 days.

(21) Appl. No.: 14/804,584

(22) Filed: Jul. 21, 2015

(65) Prior Publication Data

US 2016/0041935 A1 Feb. 11, 2016

(30) Foreign Application Priority Data

Aug. 11, 2014 (JP) ................. 2014-163606

(51) Int. Cl.
| | |
|---|---|
| *H04L 5/00* | (2006.01) |
| *G06F 13/40* | (2006.01) |
| *G06F 13/42* | (2006.01) |
| *G06F 13/364* | (2006.01) |
| *H04L 12/24* | (2006.01) |
| *H04L 1/22* | (2006.01) |

(52) U.S. Cl.
CPC ........ *G06F 13/4022* (2013.01); *G06F 13/364* (2013.01); *G06F 13/4282* (2013.01); *H04L 5/0091* (2013.01); *H04L 1/22* (2013.01); *H04L 41/069* (2013.01)

(58) Field of Classification Search
CPC ..... H04L 5/00091; H04L 1/22; H04L 41/069; H04L 5/0091
See application file for complete search history.

(56) References Cited

U.S. PATENT DOCUMENTS

2005/0262284 A1 11/2005 Cherukuri et al.
2007/0070885 A1* 3/2007 Uddenberg ........... H04L 41/069
　　　　　　　　　　　　　　　　　　　　　　370/225

(Continued)

FOREIGN PATENT DOCUMENTS

| JP | 2001-7747 | 1/2001 |
|---|---|---|
| JP | 2004-349764 | 12/2004 |

(Continued)

OTHER PUBLICATIONS

Japanese Office Action dated Mar. 27, 2018 in related Japanese Patent Application No. 2014-163606.

*Primary Examiner* — Zachary K Huson
(74) *Attorney, Agent, or Firm* — Staas & Halsey LLP

(57) ABSTRACT

An electronic device includes a communication unit configured to be connected to another communication unit via a first number of transmission paths, where the first number is greater than or equal to two, and a control unit configured to determine communication quality in each of the first number of the transmission paths at a time of initiating communication with the other communication unit and to select a second number of transmission paths, where the second number is less than the first number, in descending order of the communication quality from among the first number of the transmission paths, thereby causing the communication unit to perform communication by using the second number of the transmission paths, which have better communication quality.

11 Claims, 16 Drawing Sheets

(56) References Cited

U.S. PATENT DOCUMENTS

| | | | |
|---|---|---|---|
| 2007/0239925 A1 | 10/2007 | Koishi | |
| 2008/0147959 A1 | 6/2008 | Freimuth et al. | |
| 2008/0168161 A1* | 7/2008 | Lucas | H04L 41/069 |
| | | | 709/223 |
| 2014/0129723 A1* | 5/2014 | Kaufmann | G06F 13/385 |
| | | | 709/227 |

FOREIGN PATENT DOCUMENTS

| | | |
|---|---|---|
| JP | 2005-332357 | 12/2005 |
| JP | 2007-280237 | 10/2007 |
| JP | 2008-160227 | 7/2008 |
| JP | 2008-165776 | 7/2008 |
| JP | 2009-177739 | 8/2009 |

* cited by examiner

| CIRCUIT NUMBER | 1 | 2 | 3 | 4 | 5 | 6 | 7 | 8 | 9 | 10 | 11 | 12 |
|---|---|---|---|---|---|---|---|---|---|---|---|---|
| PHY NUMBER | 5 | - | 7 | - | 9 | 8 | 6 | 3 | 4 | - | 11 | 10 |
| SPEED ([Gbps]) | 12 | 6 | 12 | F | 12 | 12 | 12 | 12 | 6 | 6 | 12 | 12 |
| SETTING VALUE (C1) | 1 | - | 2 | - | 1 | 4 | 3 | 5 | 4 | - | 1 | 2 |
| SETTING VALUE (C3) | 5 | - | 3 | - | 2 | 1 | 3 | 5 | 4 | - | 1 | 1 |
| EN FLAG | 0 | 0 | 0 | 0 | 1 | 1 | 0 | 0 | 0 | - | 1 | 1 |

FIG. 11

CIRCUIT NUMBER #11: $Y_{11} = 0.5 + 1 = 1.5$ → PHY NUMBER: 11 ⎫
CIRCUIT NUMBER #12: $Y_{12} = 1 + 1 = 2$ → PHY NUMBER: 10 ⎬ ENABLE CORRESPONDING TRANSMISSION PATHS
CIRCUIT NUMBER #5: $Y_5 = 0.5 + 2 = 2.5$ → PHY NUMBER: 9 ⎬
CIRCUIT NUMBER #6: $Y_6 = 2 + 1 = 3$ → PHY NUMBER: 8 ⎭

---

CIRCUIT NUMBER #3: $Y_3 = 1 + 3 = 4$ → PHY NUMBER: 7 ⎫
CIRCUIT NUMBER #7: $Y_7 = 1.5 + 3 = 4.5$ → PHY NUMBER: 6 ⎬
CIRCUIT NUMBER #1: $Y_1 = 0.5 + 5 = 5.5$ → PHY NUMBER: 5 ⎬
CIRCUIT NUMBER #9: $Y_9 = 2 + 4 = 6$ → PHY NUMBER: 4 ⎬ DISABLE CORRESPONDING TRANSMISSION PATHS
CIRCUIT NUMBER #8: $Y_8 = 2.5 + 5 = 7.5$ → PHY NUMBER: 3 ⎬
CIRCUIT NUMBER #2: $Y_2$ = INCOMPUTABLE → PHY NUMBER: BLANK ⎬
CIRCUIT NUMBER #10: $Y_{10}$ = INCOMPUTABLE → PHY NUMBER: BLANK ⎬
CIRCUIT NUMBER #4: $Y_4$ = INCOMPUTABLE → PHY NUMBER: BLANK ⎭

ELECTRONIC DEVICE, COMMUNICATION CONTROL CIRCUIT, AND COMMUNICATION CONTROL METHOD

CROSS-REFERENCE TO RELATED APPLICATION

This application is based upon and claims the benefit of priority of the prior Japanese Patent Application No. 2014-163606, filed on Aug. 11, 2014, the entire contents of which are incorporated herein by reference.

FIELD

The embodiments discussed herein are related to an electronic device, a communication control circuit, and a communication control method.

BACKGROUND

Within electronic devices such as information processing devices or between electronic devices, serial transmission has been increasingly performed in order to transfer data signals at high speeds. Typical standards of such high-speed serial transmission are Serial Attached Small Computer System Interface (Serial Attached SCSI) (SAS) and Peripheral Component Interconnect Express (PCI Express, hereinafter, abbreviated as "PCIe").

Among interface circuits of such high-speed serial transmission, interface circuits that support communication activities at transmission speeds exist. In addition, among the interface circuits that support communication activities at transmission speeds, there exists an interface circuit that determines speeds at the time of communication by performing training of communication at the time of initiating a connection with an opposite-side circuit. In, for example, the SAS standard, a negotiation sequence for determining a communication speed at the time of link-up is specified.

Note that, as a technology related to reconstruction of a PCIe link, there has been proposed a computer system in which slot units are connected to hosts via a link controller and a crosspoint switch so that combination of the hosts and the slots and bandwidths of connection paths are able to be changed.

Such a technology has been disclosed in Japanese Laid-open Patent Publication No. 2007-280237.

In some cases, as a printed-circuit board in which an interface circuit for high-speed serial transmission is implemented or a printed-circuit board in which a transmission path between interface circuits is implemented, a low-cost printed-circuit board having poor transmission quality is used in order to reduce manufacturing costs. In such a case, it is likely that communication between interface circuits is performed at a less-than-desired speed. In a case of performing such training as described above, used for determining a transmission speed at, for example, the time of initiating a connection, it is likely that an interface circuit will fail during link-up at the maximum transmission speed supported by both the interface circuit itself and an opposite side and will initiate communication at a speed lower than the maximum transmission speed.

In one aspect, an object of the present technology is to provide an electronic device, a communication control circuit, and a communication control method that each reduce the chance of reducing communication speed.

SUMMARY

According to an aspect of the invention, an electronic device includes a communication unit configured to be connected to another communication unit via a first number of transmission paths, where the first number is greater than or equal to two, and a control unit configured to determine communication quality in each of the first number of the transmission paths at a time of initiating communication with the other communication unit and to select a second number of transmission paths, where the second number is less than the first number, in descending order of the communication quality from among the first number of the transmission paths, thereby causing the communication unit to perform communication by using the second number of the transmission paths, which have better communication quality.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of information registered in a determination table;

FIG. 11 is a graph illustrating an example of a calculation result of an evaluation value;

DESCRIPTION OF EMBODIMENTS

Hereinafter, embodiments of the present technology will be described with reference to the drawings.

First Embodiment

Figure 1:
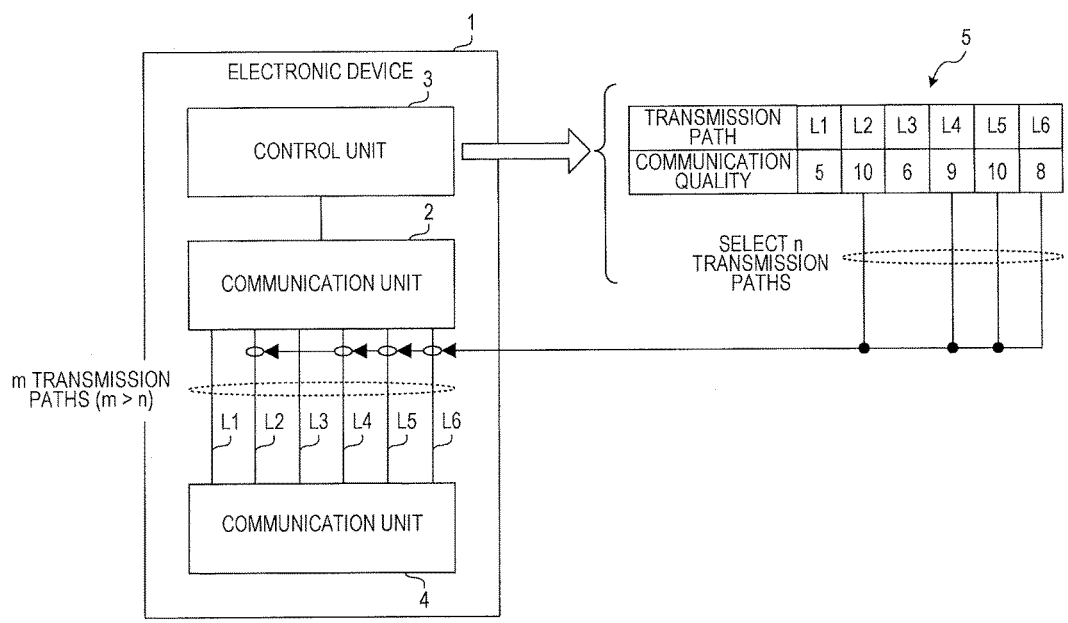
FIG. 1 is a diagram illustrating an example of a configuration and an example of processing of an electronic device according to a first embodiment.

FIG. 1 is a diagram illustrating an example of a configuration and an example of processing of an electronic device according to a first embodiment. An electronic device 1 illustrated in FIG. 1 includes a communication unit 2 and a control unit 3. The communication unit 2 is physically connected to another communication unit 4 serving as a communication partner via m transmission paths. In FIG. 1, m=6 is adopted as an example, and the communication unit 2 and the communication unit 4 are connected to each other via 6 transmission paths L1 to L6. Note that the communication unit 4 may be provided within the electronic device 1, as in the example of FIG. 1, or may be provided outside of the electronic device 1.

The communication unit 2 is able to transmit and receive data via each of the m transmission paths. However, in a case where communication with the communication unit 4 is performed, communication is performed under the control of the control unit 3, using n transmission paths out of the m transmission paths (n<m). A configuration in which communication is performed by bringing together and using, for example, n transmission paths as one logical communication port may be considered. In the SAS standard, such a logical communication port is called a "wide port".

Here, it is assumed that one or both of a circuit for realizing the communication unit 2 and a circuit for realizing the communication unit 4 are implemented on a low-cost low-quality printed-circuit board. In this case, there is a possibility that transmission performance in each of the m transmission paths deteriorates and it becomes difficult to stably perform communication at a speed greater than or equal to a desired speed. In addition, in a case where the m transmission paths that connect the communication unit 2 and the communication unit 4 to each other are implemented on a low-cost printed-circuit board, there is a possibility that the same problem occurs.

Therefore, in the electronic device 1, the communication unit 2 and the communication unit 4 are preliminarily connected to each other using the m transmission paths more than n. In addition, at the time of initiating communication with the communication unit 4, the control unit 3 determines communication quality in each of the m transmission paths. From among the m transmission paths, the control unit 3 selects n transmission paths in descending order of determined communication quality and causes the communication unit 2 to perform communication by using the selected n transmission paths. From this, there is an increased possibility of performing communication at a speed greater than or equal to a desired speed in each of the n transmission paths. Therefore, the possibility that a communication speed between the communication unit 2 and the communication unit 4 is decreased may be decreased over all. Note that in many cases some errors or variations are generated in the width of wiring lines or the gap between adjacent wirings during manufacturing printed-circuit boards and, as a result, transmission quality of transmission lines may vary. According to the present embodiment, it is possible to use only a portion whose quality is good within the range of variations in quality.

In the example of FIG. 1, the control unit 3 determines communication quality in each of the transmission paths L1 to L6 and records a determination result in a determination table 5. It is assumed that an index indicating the communication quality recorded in the determination table 5 indicates that the communication quality increases with an increase in the value of the index. In a case of n=4, as in the example of FIG. 1, the control unit 3 selects the transmission paths L2, L5, L4, and L6 in descending order of communication quality and causes the communication unit 2 to initiate communication with the communication unit 4 by using the transmission paths L2, L5, L4, and L6.

According to the first embodiment described above, even in a case where a low-cost low-quality circuit board is used as at least one of the printed-circuit board in which the circuit for realizing the communication unit 2 is implemented, the printed-circuit board in which the circuit for realizing the communication unit 4 is implemented, and a circuit board in which the m transmission paths are implemented, there is an increased possibility of stably performing communication at a high speed greater than or equal to a desired speed by using the n transmission paths. Accordingly, while reducing manufacturing costs of the electronic device 1, the communication partner thereof, a transmission path circuit board between the electronic device 1 and the communication partner, and so forth, the possibility of the decreased communication speed may be reduced.

Second Embodiment

In a second embodiment, a storage system will be exemplified as a system including the electronic device 1 of the first embodiment.

Figure 2:
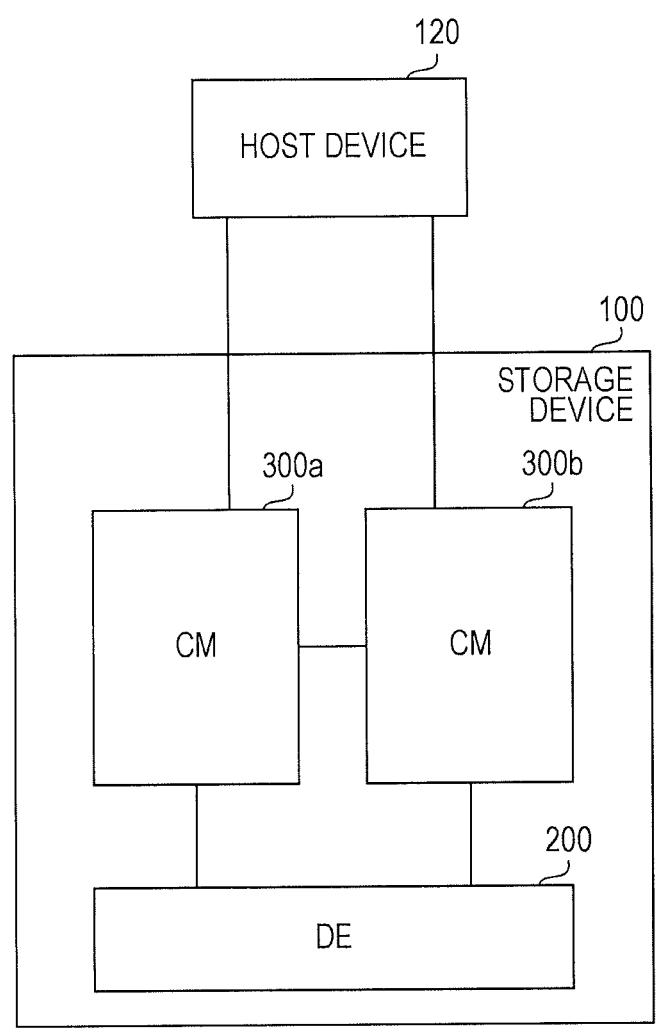
FIG. 2 is a diagram illustrating an example of a configuration of a storage system according to a second embodiment.

FIG. 2 is a diagram illustrating an example of a configuration of the storage system according to the second embodiment. The storage system illustrated in FIG. 2 includes a storage device 100 and a host device 120. The host device 120 requests, from the storage device 100, access to a storage unit within the storage device 100. The storage device 100 includes a drive enclosure (DE) 200 and controller modules (CM) 300a and 300b.

The DE 200 is a storage unit to serve as access target for the host device 120. In the DE 200, as storage devices for configuring the storage unit, HDDs are mounted. Note that the DE 200 may be provided outside of, for example, the storage device 100. In addition, the storage devices are not limited to the HDDs, and other types of storage device such as, for example, solid state drives (SSDs) may be used.

Each of the CMs 300a and 300b is a storage control unit that controls access to the storage unit. In other words, each of the CMs 300a and 300b controls access to an HDD within the DE 200 in accordance with an access request from the host device 120. Upon receiving, from the host device 120, for example, a read request for data stored on an HDD within the DE 200, each of the CMs 300a and 300b reads, from the corresponding HDD within the DE 200, the data requested to be read and transmits the data to the host device 120. In addition, upon receiving, from the host device 120, a request to write data to an HDD within the DE 200, each of the CMs 300a and 300b writes, to the corresponding HDD within the DE 200, the data requested to be written.

In addition, the CM 300a and the CM 300b are able to perform communication with each other via a communication path. One CM of the CMs 300a and 300b is able to acquire, via the above-mentioned communication path, for example, abnormality detection information indicating an abnormality that occurs in the other CM. In addition, one CM is able to transmit, for example, cache data of an HDD, stored in a random access memory (RAM) in the relevant CM, to the other CM via the above-mentioned communication path and to request the other CM to back up the cache data to the RAM therein.

Figure 3:
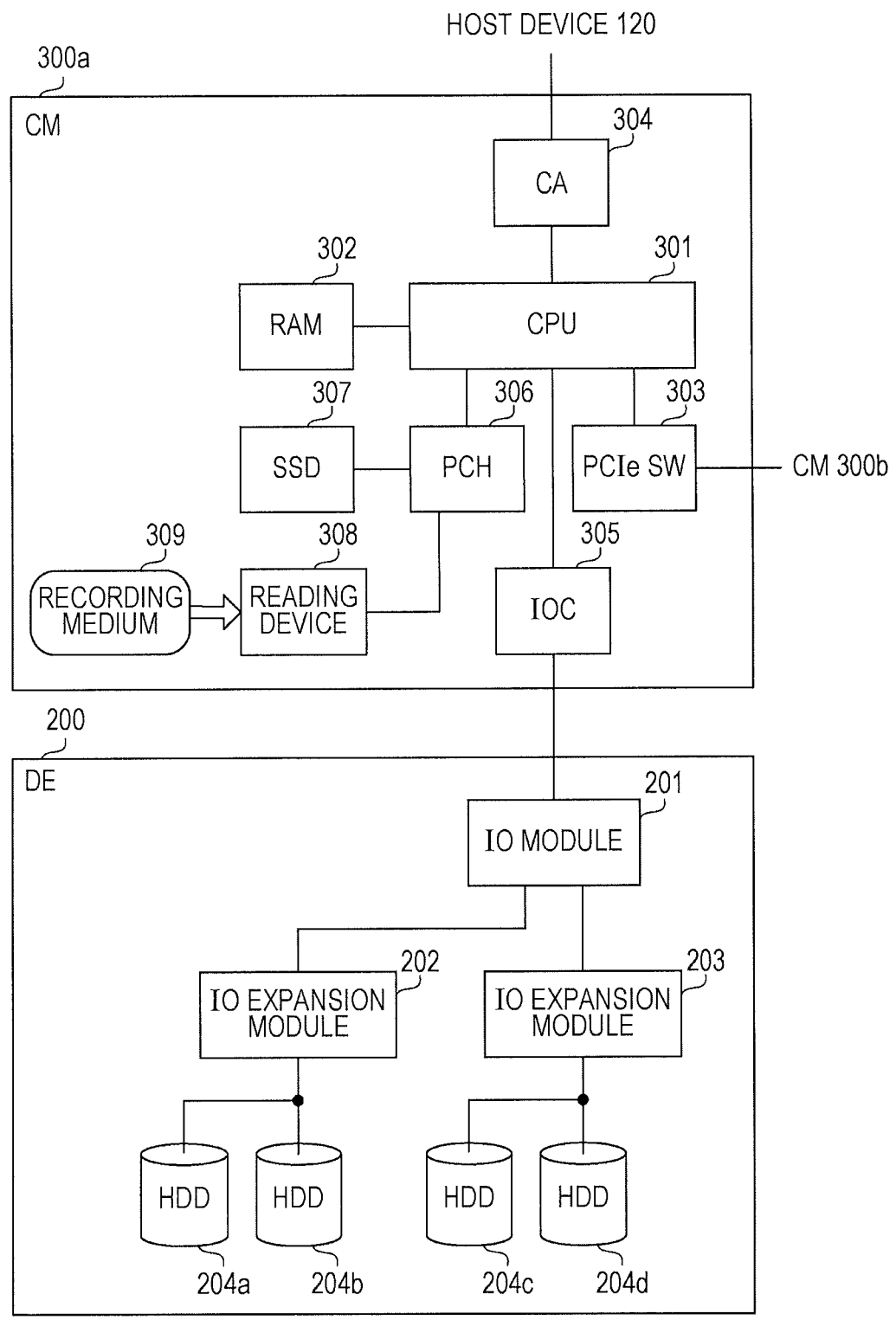
FIG. 3 is a diagram illustrating examples of hardware configurations of a CM and a DE.

FIG. 3 is a diagram illustrating examples of hardware configurations of a CM and a DE. Note that since the CMs 300a and 300b each have the same hardware configuration, only the CM 300a is illustrated, as a representative thereof, in FIG. 3 and the description of the hardware configuration of the CM 300b will be omitted.

The CM 300a includes a central processing unit (CPU) 301, a RAM 302, a PCIe switch 303, a channel adapter (CA) 304, an input/output controller (IOC) 305, a platform controller hub (PCH) 306, an SSD 307, and a reading device 308.

The CPU 301 controls the entire CM 300a in a comprehensive manner. The RAM 302 is used as a main storage device of the CM 300a and temporarily stores therein at least a portion of a program to be executed by the CPU 301 and various kinds of data desired for processing based on the program. In addition, the RAM 302 is used as a cache area for data stored on the HDDs within the DE 200.

The PCIe switch 303 is connected to the CPU 301 via a PCIe bus. In addition, the PCIe switch 303 is connected to a PCIe switch (not illustrated) within the CM 300b on the other side via a PCIe cable. The PCIe switch 303 controls transmission and reception of data between the CPU 301 in the CM 300a and the CM 300b.

The CA 304 is connected to the CPU 301 via the PCIe bus. In addition, the CA 304 is connected to the host device 120 via, for example, a Fibre Channel (FC) cable. The CA 304 performs interface processing for transmitting and receiving data between the CPU 301 and the host device 120.

The IOC 305 is connected to the CPU 301 via the PCIe bus. In addition, the IOC 305 is connected to the DE 200 via a SAS cable. The IOC 305 performs interface processing for transmitting and receiving data between the CPU 301 and the HDDs within the DE 200 serving as a SAS device. In other words, the IOC 305 includes a PCIe controller that controls communication based on a PCIe standard and a SAS controller that controls communication based on the SAS standard.

The PCH 306 transmits and receives data between the CPU 301 and the SSD 307 and reading device 308. The SSD 307 is used as a secondary storage device of the CM 300a and stores therein a program to be executed by the CPU 301 and various kinds of data and so forth desired for execution thereof. Note that, as the secondary storage device, another type of non-volatile storage device such as, for example, an HDD may be used. A portable recording medium 309 may be connected and disconnected to and from the reading device 308. The reading device 308 reads data recorded to the recording medium 309 and transmits the data to the CPU 301. As the recording medium 309, an optical disk, a magneto-optical disk, a semiconductor memory, and so forth may be used.

On the other hand, the DE 200 includes an input/output (IO) module 201 serving as an input and output module, IO expansion modules 202 and 203, and HDDs 204a to 204d. The IO module 201 is connected to the IO expansion modules 202 and 203 and the IOC 305 in the CM 300a. The IO module 201 has a function of serving as a SAS expander that transmits and receives data between the IO expansion modules 202 and 203 and the IOC 305 in the CM 300a in accordance with the SAS standard.

The IO expansion module 202 is connected to the IO module 201 and the HDDs 204a and 204b. The IO expansion module 202 has a function of serving as a SAS expander that transmits and receives data between the IO module 201 and the HDDs 204a and 204b in accordance with the SAS standard. The IO expansion module 203 is connected to the IO module 201 and the HDDs 204c and 204d. The IO expansion module 203 has a function of serving as a SAS expander that transmits and receives data between the IO module 201 and the HDDs 204c and 204d in accordance with the SAS standard.

Note that the number of the IO expansion modules connected to the IO module 201 is not limited to two, as in the example of FIG. 3, or may be one or three or more. In addition, the number of the HDDs connected to each of the IO expansion modules 202 and 203 is not limited to two, as in the example of FIG. 3, or may be one or three or more.

Next, the SAS expander function provided in each of the IO module 201 and the IO expansion modules 202 and 203 in the DE 200 will be described. The SAS expander function is realized by, for example, the following expander chip.

Figure 4:
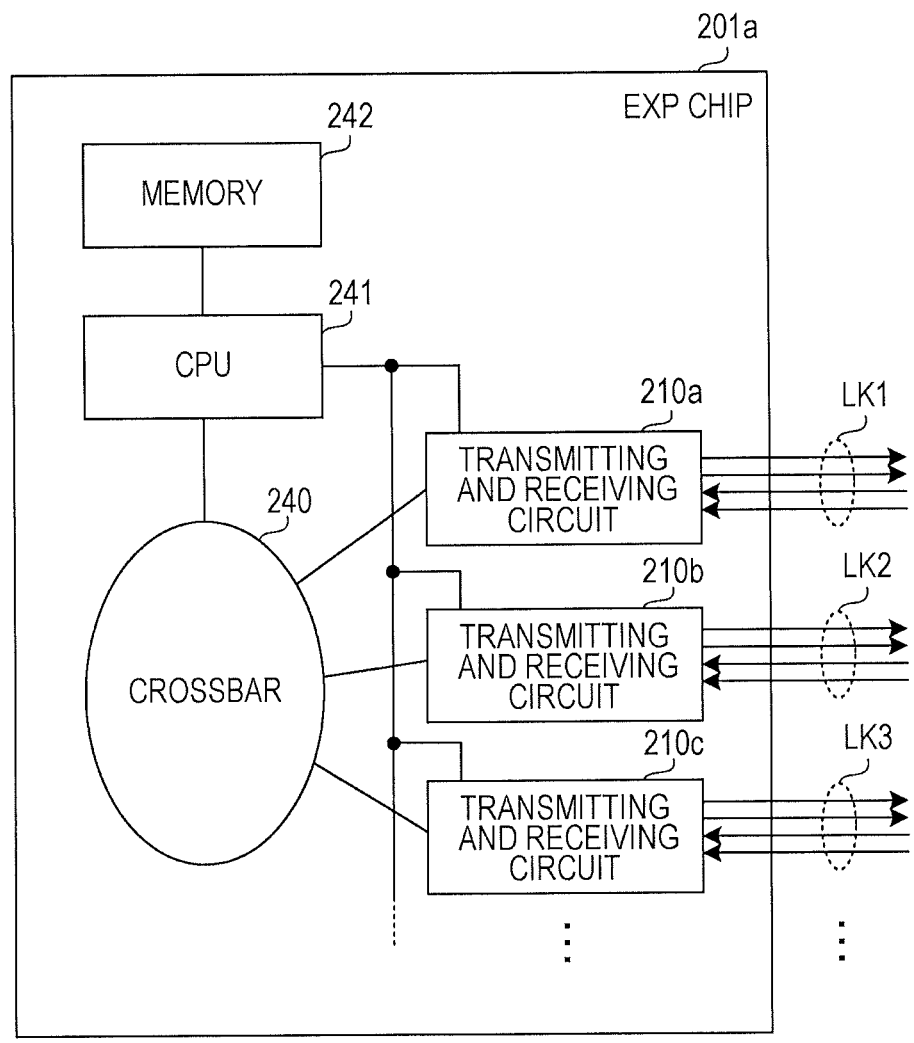
FIG. 4 is a diagram illustrating an example of a hardware configuration of an expander chip.

FIG. 4 is a diagram illustrating an example of a hardware configuration of the expander chip. While, as an example, an expander chip 201a provided in the IO module 201 is illustrated in FIG. 4, expander chips provided in the IO expansion modules 202 and 203 are realized by a similar internal configuration.

The expander chip 201a includes transmitting and receiving circuits 210a, 210b, 210c, . . . , a crossbar 240, a CPU 241, and a memory 242. Note that the transmitting and receiving circuits 210a, 210b, 210c, . . . constitute an example of the communication unit 2 in the first embodiment, and the CPU 241 is an example of the control unit 3 in the first embodiment.

Discrete physical links LK1, LK2, LK3, . . . are connected to the transmitting and receiving circuits 210a, 210b, 210c, . . . , respectively. The term "physical link" means a minimum unit consisting of a data transmission path in the SAS standard and includes 4 signal lines which include a pair of differential signal lines for transmission and a pair of differential signal lines for reception. The transmitting and receiving circuits 210a, 210b, 210c, . . . transmit and receive, via the corresponding physical links LK1, LK2, LK3, . . . , respectively, data to and from corresponding receiving and transmitting circuits provided in another expander chip (or SAS controller) which is not illustrated and serves as a communication partner.

Note that, in the following description, each of the physical links LK1, LK2, LK3, . . . is called a "transmission path" in some cases.

Here, as connection configurations of SAS, there are a narrow port and a wide port. The narrow port is a configuration in which communication is performed using one physical link for one port. The wide port is a configuration in which communication is performed using physical links for one port. In the wide port, it is possible to bring together and use, as one logical communication port, up to 8 physical links. In a case of, for example, a SAS 2.0 standard, a maximum transmission speed in one physical link is 6 gigabits per second (Gbps). Therefore, it becomes possible to perform communication at up to 48 Gbps by applying the wide port.

In addition, the transmitting and receiving circuits 210a, 210b, 210c, . . . each have a function of executing a predetermined link-up sequence at the time of link-up. The link-up sequence includes training for determining the communication speed of preliminarily specified communication speeds at which it is possible to perform, via the corresponding physical link, communication and training for determining an optimum setting value of an equalizer in each of a transmitting side and a receiving side or one of the transmitting side and the receiving side. In what follows, the former is called "speed setting training" and the latter is called "parameter setting training", in some cases.

Under the control of the CPU 241, the crossbar 240 sorts, into one of the transmitting and receiving circuits 210a, 210b, 210c, . . . , data to be transmitted from the expander chip 201a to another expander chip (or a SAS controller chip). The CPU 241 performs various kinds of operation control in the expander chip 201a, such as sorting of transmission data in the crossbar 240. The configuration of the narrow port and the wide port used for a connection and the number of physical ports used for configuring the wide port are controlled by the CPU 241. In the memory 242, a firmware program to be executed by the CPU 241 and various kinds of data to be used in processing in the CPU 241 are stored. The memory 242 is realized by, for example, a flash memory.

Figure 5:
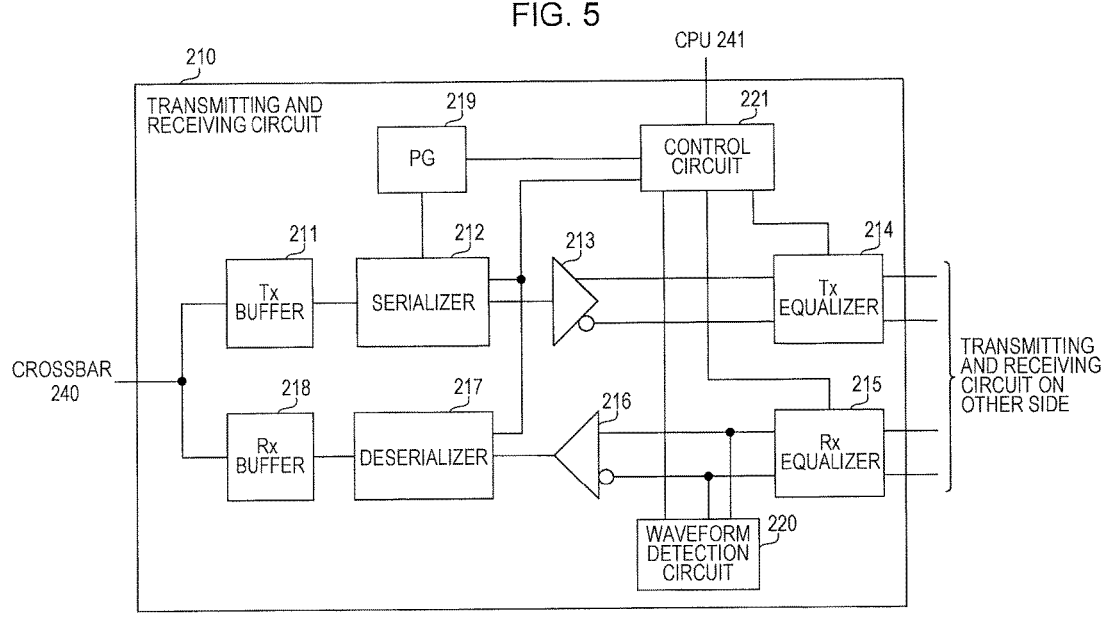
FIG. 5 is a diagram illustrating an example of a hardware configuration of a transmitting and receiving circuit within the expander chip.

FIG. 5 is a diagram illustrating an example of a hardware configuration of a transmitting and receiving circuit within the expander chip. Note that since the transmitting and receiving circuits 210a, 210b, 210c, . . . each have a similar hardware configuration, these are each indicated by a "transmitting and receiving circuit 210" in FIG. 5. In addition, from this point forward, in a case of explaining the transmitting and receiving circuits 210a, 210b, 210c, . . . without distinction, the expression of "transmitting and receiving circuit 210" is used.

The transmitting and receiving circuit 210 includes a Tx buffer 211, a serializer 212, a Tx driver 213, a Tx equalizer 214, an Rx equalizer 215, an Rx driver 216, a deserializer 217, an Rx buffer 218, a pattern generator (PG) 219, a waveform detection circuit 220, and a control circuit 221.

The Tx buffer 211 temporarily stores therein transmission data received from the crossbar 240 and outputs the stored transmission data to the serializer 212. The serializer 212 converts the transmission data received from the Tx buffer 211 from parallel data into serial data and outputs the serial data. In addition, the serializer 212 is able to output a test signal (test pattern) for training, received from the pattern generator 219, to the Tx driver 213. The Tx driver 213 converts the transmission data or the test signal, received from the serializer 212, into a differential signal and outputs the differential signal.

The Tx equalizer 214 subjects, to shaping, a waveform of the differential signal received from the Tx driver 213 and outputs the differential signal subjected to shaping to a corresponding physical link via a connector, not illustrated. As the types of waveform shaping performed in the Tx equalizer 214, there are, for example, pre-emphasis adjustment, pre-shoot adjustment, gain adjustment, and so forth. Individual waveform adjustment amounts in the Tx equalizer 214 are specified by the control circuit 221.

The Rx equalizer 215 subjects, to shaping, a waveform of a differential signal received from the corresponding physical link via a connector, not illustrated, and outputs the differential signal to the Rx driver 216. As a waveform shaping method, a method such as decision feedback equalization (DFE) or feed-forward equalization (FFE) is used.

The Rx driver 216 converts the differential signal output by the Rx equalizer 215 into a serial signal of a predetermined format and outputs the serial signal to the deserializer 217. The deserializer 217 converts the serial signal received from the Rx driver 216 into a parallel signal and outputs the parallel signal to the Rx buffer 218. After temporarily storing therein the parallel signal output by the deserializer 217, the Rx buffer 218 outputs the parallel signal to the crossbar 240.

At the time of performing the speed setting training and the parameter setting training where the transmitting and receiving circuit 210 itself is set as a transmitting side, the pattern generator 219 supplies the test signal for training to the serializer 212 in accordance with an instruction from the control circuit 221.

At the time of performing the parameter setting training where the transmitting and receiving circuit 210 itself is set as a receiving side, the waveform detection circuit 220 detects a waveform of the test signal output by the Rx equalizer 215 and notifies the control circuit 221 of the waveform state with information. As the information indicating the state of the waveform, there is information indicating, for example, an opening state of an eye pattern.

The control circuit 221 controls various kinds of processing in the transmitting and receiving circuit 210. The control circuit 221 controls an operation of, for example, a link-up sequence. If the speed setting training is performed within the link-up sequence, the control circuit 221 notifies the CPU 241 of a communication speed at which communication with a communication destination is correctly performed. In addition, if the parameter setting training is performed, the control circuit 221 notifies the CPU 241 of an optimum value of a setting parameter of the Rx equalizer 215 or optimum values of setting parameters of the Tx equalizer 214 and the Rx equalizer 215. Note that a circuit on a transmitting side negotiates with a circuit on a receiving side, thereby determining the optimum value of the setting parameter of the Tx equalizer 214.

Figure 6:
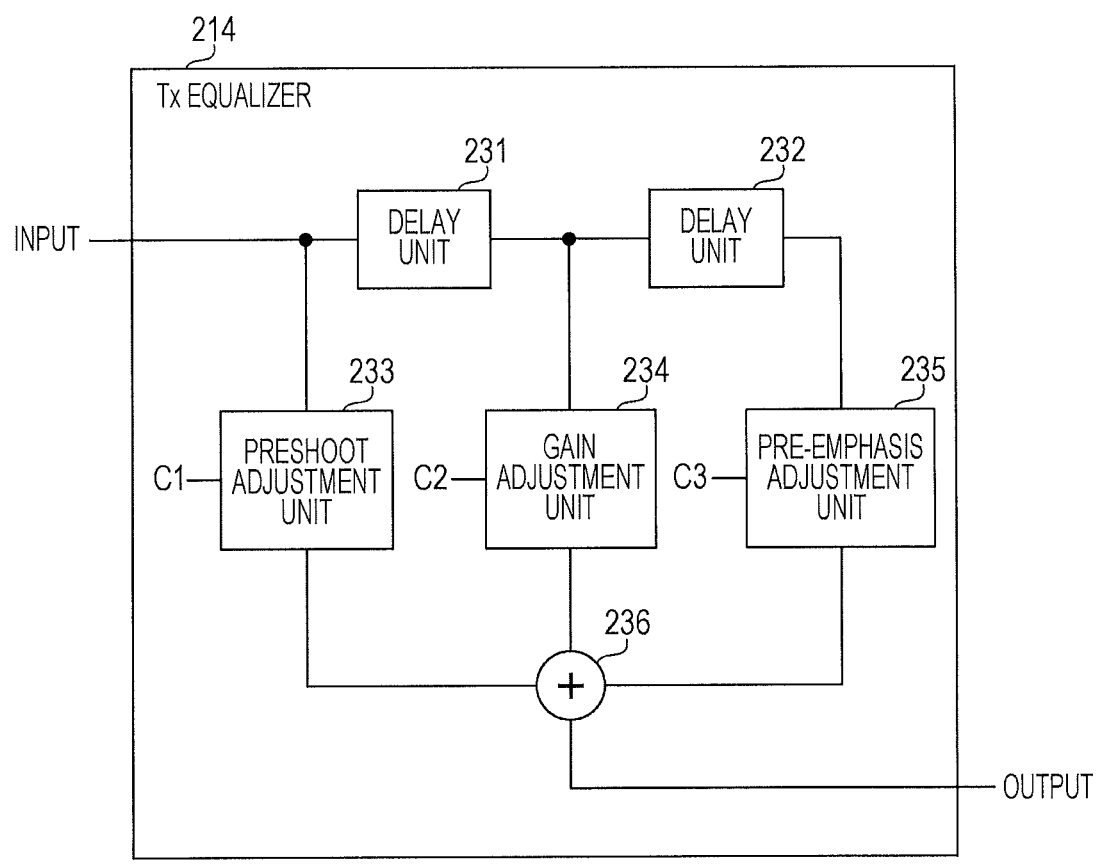
FIG. 6 is a diagram illustrating an example of an internal configuration of a Tx equalizer.

FIG. 6 is a diagram illustrating an example of an internal configuration of an Tx equalizer. The Tx equalizer 214 includes delay units 231 and 232, a pre-shoot adjustment unit 233, a gain adjustment unit 234, a pre-emphasis adjustment unit 235, and an addition unit 236.

An input signal from the Tx driver 213 is input into the delay unit 231 and the pre-shoot adjustment unit 233. The delay unit 231 delays the input signal by one unit interval (UI) and outputs the input signal to the delay unit 232 and the gain adjustment unit 234. The term "UI" means a time period corresponding to one bit of data transmitted and received via a physical link. The delay unit 232 further delays the input signal delayed by the delay unit 231 by one UI and outputs the input signal to the pre-emphasis adjustment unit 235.

The pre-shoot adjustment unit 233, the gain adjustment unit 234, and the pre-emphasis adjustment unit 235 assign gain values to the levels of the respective signals input thereto. In other words, the pre-shoot adjustment unit 233, the gain adjustment unit 234, and the pre-emphasis adjustment unit 235 correct the levels of the respective signals input thereto. Output signals from the pre-shoot adjustment unit 233, the gain adjustment unit 234, and the pre-emphasis adjustment unit 235 are added by the addition unit 236 and output to the corresponding transmission path.

Based on such a configuration, the following adjustment of a signal level is performed. Based on gain adjustment in the pre-shoot adjustment unit 233, a signal level is adjusted so that the signal level immediately before the transmission signal transitions from a low level to a high level increases and the signal level is adjusted so that the signal level immediately before the transmission signal transitions from a high level to a low level decreases. In addition, based on gain adjustment in the pre-emphasis adjustment unit 235, a signal level is adjusted so that the signal level immediately after the transmission signal transitions from a low level to a high level increases and the signal level is adjusted so that the signal level immediately after the transmission signal transitions from a high level to a low level decreases. In addition, based on gain adjustment in the gain adjustment unit 234, the signal level of the transmission signal is adjusted regardless of transition of the signal level.

Here, a gain amount in the pre-shoot adjustment unit 233 is determined by a parameter C1 set by the control circuit 221. A gain amount in the gain adjustment unit 234 is determined by a parameter C2 set by the control circuit 221. A gain amount in the pre-emphasis adjustment unit 235 is determined by a parameter C3 set by the control circuit 221.

In each of the pre-shoot adjustment unit 233, the gain adjustment unit 234, and the pre-emphasis adjustment unit 235, in a case where the value of the corresponding set parameter (C1, C2, or C3) is "0", the corresponding gain amount becomes "0" and the signal level is not corrected. In addition, in a case where the value of the corresponding set parameter is larger than "0", the signal level is corrected by an amount corresponding to the numerical value thereof. In other words, a correction amount of the signal level in a corresponding adjustment unit decreases with a decrease in the numerical value of one corresponding parameter C1 to C3.

Next, communication between the IO module 201 and the IO expansion modules 202 and 203 in the DE 200 will be described. In the DE 200, in order to reduce manufacturing costs, as a printed-circuit board in which each of expander chips of the IO module 201 and the IO expansion modules 202 and 203 is implemented, a low-cost printed-circuit board having poor transmission quality is used in some cases. In addition, as printed-circuit boards or flexible circuit boards for connecting individual expander chips to each other, low-cost circuit boards are used in some cases. In such a case, communication speeds between the expander chips are sometimes decreased.

Figure 7:
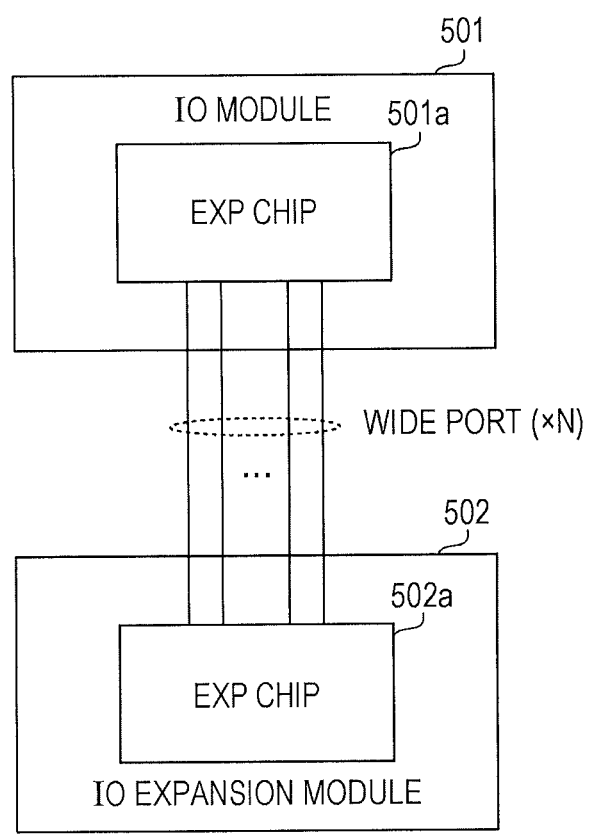
FIG. 7 is a diagram illustrating a reference example of a connection configuration between expander chips, which utilizes a wide port.

Here, FIG. 7 is a diagram illustrating a reference example of a connection configuration between expander chips, which utilizes a wide port. In FIG. 7, an IO module 501 is a reference example corresponding to the IO module 201 in the present embodiment and an IO expansion module 502 is a reference example corresponding to the IO expansion module 202 or the IO expansion module 203 in the present embodiment.

Between an expander chip 501a within the IO module 501 and an expander chip 502a within the IO expansion module 502, communication is performed by a wide port utilizing, for example, N transmission paths (N physical links). In a case of an expander chip compliant with, for example, a SAS 3.0 standard, it is possible to perform communication at up to 12 Gbps per transmission path. In this case, if communication is performed by the wide port utilizing, for example, 4 transmission paths on the assumption of N=4, a throughput of up to 4.8 GByte/s is obtained.

However, if, as a printed-circuit board in which at least one of the expander chips 501a and 502a is implemented, a low-cost printed-circuit board is used, communication quality deteriorates in at least one of the N transmission paths and it becomes difficult to perform a connection at 12 Gbps in some cases. In addition, if, as a circuit board for connecting the expander chip 501a and the expander chip 502a to each other, a low-cost circuit board is used, the same case may occur.

As an example of a method for coping with such a case, there is a method in which transmission speeds are decreased in all the N transmission paths and communication is initiated. This is a coping method that assumes a possibility that, in, for example, a transmission path in which it is possible to link up at a high speed, a transmission speed becomes unstable after communication is initiated. According to this method, if, for example, N=4 is adopted and a transmission speed in each transmission path is decreased to 6 Gbps, a throughput in all the transmission paths is decreased to 2.4 GByte/s.

For such a problem, in the present embodiment, as illustrated in the following FIG. 8, a configuration in which expander chips are physically connected to each other in advance using M transmission paths more than N is adopted.

Figure 8:
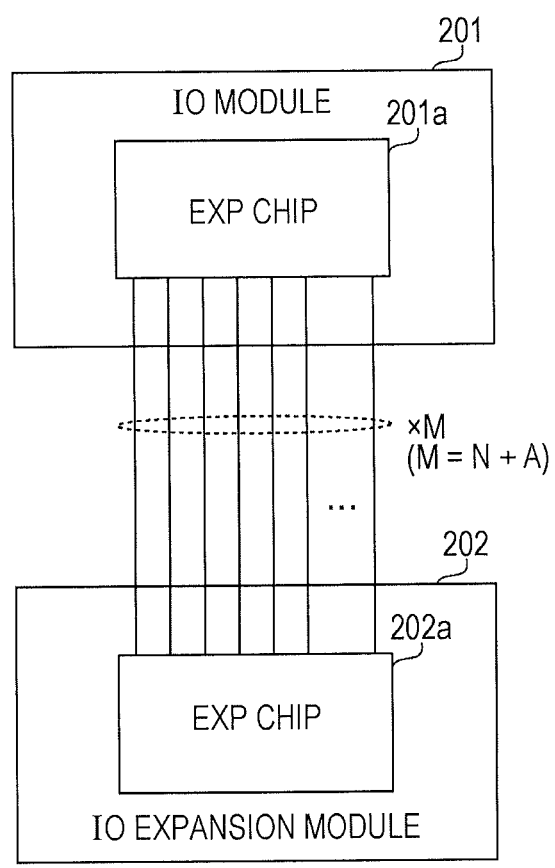
FIG. 8 is a diagram illustrating an example of a connection configuration between expander chips in the second embodiment, which utilizes a wide port.

FIG. 8 is a diagram illustrating an example of a connection configuration between expander chips in the second embodiment, which utilizes a wide port. In FIG. 8, as an example, a connection configuration between the expander chip 201a in the IO module 201 and the expander chip 202a in the IO expansion module 202 is illustrated.

As illustrated in FIG. 8, the expander chip 201a and the expander chip 202a are connected to each other in advance using the M transmission paths more than N (in this regard, however, M=N+A). Based on an execution result of a link-up sequence, the expander chip 201a determines communication quality in each of the M transmission paths. In addition, the expander chip 201a selects N transmission paths in descending order of communication quality from among the M transmission paths and configures a wide port by using only the selected N transmission paths, thereby performing communication. From this, it becomes possible to perform communication as rapidly and stably as possible.

Note that there are many SAS expander chips each having many connection ports, for example, 36 ports among commercially available SAS expander chips. In addition, in a case where such a SAS expander chip is implemented within a device, all the mounted connection ports are sometimes not used for actual communication and redundant connection ports exist in many cases. As illustrated in FIG. 8, the configuration in which a connection is established using transmission paths more than the number of transmission paths used at the time of actual communication is able to be realized using connection ports redundant in the related art.

Figure 9:
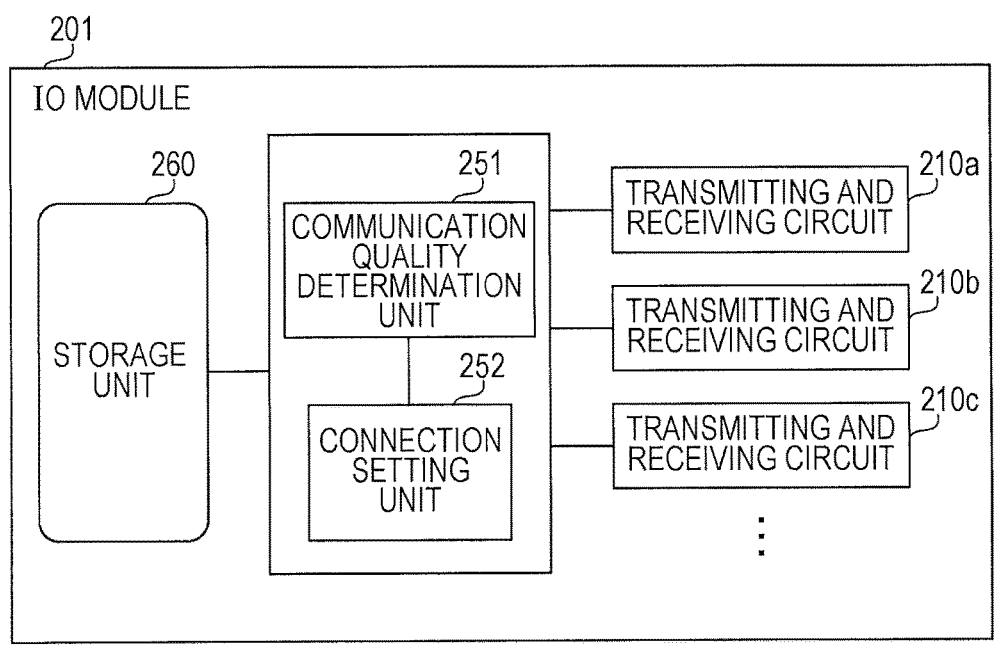
FIG. 9 is a block diagram illustrating an example of a configuration of a function of an IO module.

FIG. 9 is a block diagram illustrating an example of a configuration of a function of an IO module. The IO module 201 includes a communication quality determination unit 251, a connection setting unit 252, and a storage unit 260. The CPU 241 in the expander chip 201a within the IO module 201 executes, for example, a predetermined firmware program, thereby realizing processing operations in the communication quality determination unit 251 and the connection setting unit 252. In addition, the storage unit 260 is realized as a storage area of the memory 242 in the expander chip 201a.

At the time of linking up the M transmission paths, the communication quality determination unit 251 determines communication quality in each of the transmission paths. As described later, based on the parameters C1 and C3 acquired from each of the transmitting and receiving circuits 210a, 210b, 210c, . . . within the expander chip 201a, the communication quality determination unit 251 determines communication quality of each of the corresponding transmission paths. The communication quality determination unit 251 registers a determination value of the communication quality determined for each of the transmission paths, in a determination table stored to the storage unit 260.

Based on the determination table in which the determination value of the communication quality is registered, the connection setting unit 252 selects, from among the M transmission paths, N transmission paths in descending order of communication quality. The connection setting unit 252 only enables the selected N transmission paths and disables the remaining A transmission paths, thereby causing transmitting and receiving circuits corresponding to the selected N transmission paths to initiate communication based on the wide port utilizing the selected N transmission paths.

FIG. 10 is a diagram illustrating an example of information registered in the determination table. A determination table 261 illustrated in FIG. 10 is stored to the storage unit 260. The determination table 261 includes individual items such as a circuit number, a PHY number, a speed, respective setting values corresponding to the parameters C1 and C3, and an enable (EN) flag.

The circuit number is an identification number for identifying each of the M transmitting and receiving circuits 210 and which are physically connected to an expander chip in the IO expansion module 202 serving as a communication partner. The circuit number practically doubles as an identification number for identifying a transmission path (physical link). As an example, FIG. 10 illustrates a case of M=12 and the circuit number has a value ranging from "1" to "12". The circuit number is fixedly assigned to each of the M transmitting and receiving circuits and is not changed.

The PHY number is an identification number for identifying each of the M transmitting and receiving circuits 210 on a SAS protocol. The PHY number is arbitrarily set by the connection setting unit 252. In the SAS protocol, as transmission paths for configuring the wide port, transmission paths whose PHY numbers are large are preferentially selected. Therefore, the connection setting unit 252 assigns the PHY numbers in descending order of communication quality determined to be high. Note that it is assumed that no PHY number is assigned to a transmitting and receiving circuit 210 corresponding to a transmission path not able to link up at a speed greater than or equal to a desired speed.

The speed indicates a maximum speed at which it is determined that it is possible to perform communication in a corresponding transmission path. In the item of the speed, one of the values of 1.5 Gbps, 3 Gbps, 6 Gbps, and 12 Gbps is registered. In addition, in a case where it is difficult to link up at any speed, "F" (fault) is registered.

In the item of a setting value corresponding to the parameter C1, the value of the parameter C1 on pre-shoot adjustment, determined by the parameter setting training in the corresponding transmitting and receiving circuit 210, is registered. In the item of a setting value corresponding to the parameter C3, the value of the parameter C3 on pre-emphasis adjustment, determined by the parameter setting training in the corresponding transmitting and receiving circuit 210, is registered. Note that in a case where it is difficult to link up at 12 Gbps in a corresponding transmission path, no parameter setting training for setting the parameters C1 and C3 is performed. Therefore, no values are registered in the items of the individual setting values.

The EN flag is flag information indicating whether or not the corresponding transmitting and receiving circuit 210 is used for communication. In a case where the corresponding transmitting and receiving circuit 210 is used for communication, the EN flag is set to "1" and in a where the corresponding transmitting and receiving circuit 210 is not used for communication, the EN flag is set to "0". Among all the transmitting and receiving circuits 210 available for communication with the IO expansion module 202, there are only the N transmitting and receiving circuits 210 and whose EN flags are set to "1".

Here, the communication quality determination unit 251 determines communication quality in each of the M transmission paths, based on the parameters C1 and C3 set by the parameter setting training in the corresponding transmitting and receiving circuit 210. As described in FIG. 6, each of the parameters C1 and C3 is a parameter for determining a correction amount for correcting the waveform of a transmission signal and the correction amount decreases with a decrease in the value thereof.

In a case where it is possible to perform high-speed and stable communication even if the waveform of the transmission signal is not corrected, it is considered that the transmission performance of that transmission path is good. Therefore, the communication quality determination unit 251 determines that the communication quality increases with a decrease in the value of each of the parameters C1 and C3 set by the parameter setting training, in other words, a decrease in a correction amount of the waveform.

As for how to use the combination of the set parameters C1 and C3 for determining the communication quality, various types of method may be considered. In the present embodiment, as an example, it is assumed that the communication quality determination unit 251 calculates an evaluation value of the communication quality by using the following Expression (1).

$$YP = \alpha \cdot C1P + \beta \cdot C3P \text{ (in this regard, however, } \alpha < \beta) \quad (1)$$

In Expression (1), the YP indicates an evaluation value of communication quality in a Pth transmission path and the C1P and C3P indicate the setting values of the parameters C1 and C3, respectively, in the transmitting and receiving circuit 210 corresponding to the Pth transmission path. In addition, the $\alpha$ and p are weighting coefficients for the parameters C1 and C3, respectively. The reason why $\alpha < \beta$ is set is that in general the adjustment amount of pre-emphasis has a strong correlation with the communication quality, compared with the adjustment amount of pre-shoot. According to Expression (1), it is determined that the communication quality increases with a decrease in the calculated evaluation value.

In this way, using the parameters C1 and C3 set in the Tx equalizer by the parameter setting training, it is possible to determine the communication quality with a high degree of accuracy. In addition, while providing no new function for the determination of the communication quality, the communication quality is determined using setting functions for the parameters C1 and C3, provided in each of the transmitting and receiving circuits 210. Therefore, it is possible to suppress development and manufacturing costs of the expander chip 201a.

Note that, as another method for determining the communication quality in each of the transmission paths, there is a method in which, in a case where first a transmission path in which the setting value of the parameter C3 is, for example, a minimum and such transmission paths are selected, it is determined that a transmission path in which the parameter C1 is the smallest among these is determined to have the highest communication quality. In addition, the communication quality may be determined using only the parameter C3.

FIG. 11 is a graph illustrating an example of a calculation result of the evaluation value. The example of FIG. 11 indicates an example in a case where, based on the values of the parameters C1 and C3 illustrated in FIG. 10, the evaluation value is calculated for each of the transmitting and receiving circuits 210 in accordance with Expression (1). In this regard, however, it is assumed that $\alpha=0.5$ and $\beta=1$ are set. Note that the transmitting and receiving circuit 210 whose identification number is "X" is expressed as "circuit number #X".

In FIG. 11, the circuit numbers and calculation results of the evaluation values are rearranged in ascending order of calculated evaluation value. In this example, since small values are calculated as values of the evaluation values in the order of the circuit numbers #11, #12, #5, #6, #3, #7, #1, #9, and #8, the corresponding transmission paths are ranked in this order. In addition, the circuit numbers #2, #4, and #10 in which the parameter C1 or C3 is not set are ranked on the tail end. In this regard, however, transmission paths corresponding to the circuit numbers #2 and #10 that each succeed in link-up at 6 Gbps are ranked higher than a transmission path corresponding to the circuit number #4 in which it is difficult to link up at any speed.

In such a case as in FIG. 11, if, for example, N=4 is set, the connection setting unit 252 selects N transmitting and receiving circuits 210, in order from the beginning, in other words, the circuit numbers #11, #12, #5, and #6 and enables transmission paths corresponding to these. In addition, the connection setting unit 252 disables respective transmission paths corresponding to the remaining circuit numbers #3, #7, #1, #9, #8, #2, #10, and #4. From this, communication is initiated by the wide port utilizing 4 transmission paths and which correspond to the circuit numbers #11, #12, #5, and #6.

In the above-mentioned examples of FIG. 10 and FIG. 11, transmission paths corresponding to the circuit numbers #2, #4, and #10 each fail in link-up at a speed desired by the link-up sequence, in other words, 12 Gbps. Nevertheless, using the respective transmission paths corresponding to the circuit numbers #11, #12, #5, and #6 that each succeed in link-up at 12 Gbps, it becomes for the IO module 201 to perform communication with the IO expansion module 202 at a desired speed.

In addition, the rank order of communication quality of each of the transmission paths is held in the determination table 261. As an example of a holding method therefor, the connection setting unit 252 assigns the PHY number of a large number to each of the transmitting and receiving circuits 210 in descending order of communication quality determined to be high and registers the assigned PHY numbers in the determination table 261.

The rank order of the communication quality for each of the transmission paths is held, thereby enabling the following processing to be realized. In a case where, for example, link-down occurs or deterioration in the communication quality, such as degradation of a bit error rate (BER), occurs in one of transmission paths used for communication, the connection setting unit 252 is able to continue communication using, in place of that transmission path, a transmission path whose communication quality is determined to be the highest among the remaining transmission paths.

Figure 12:
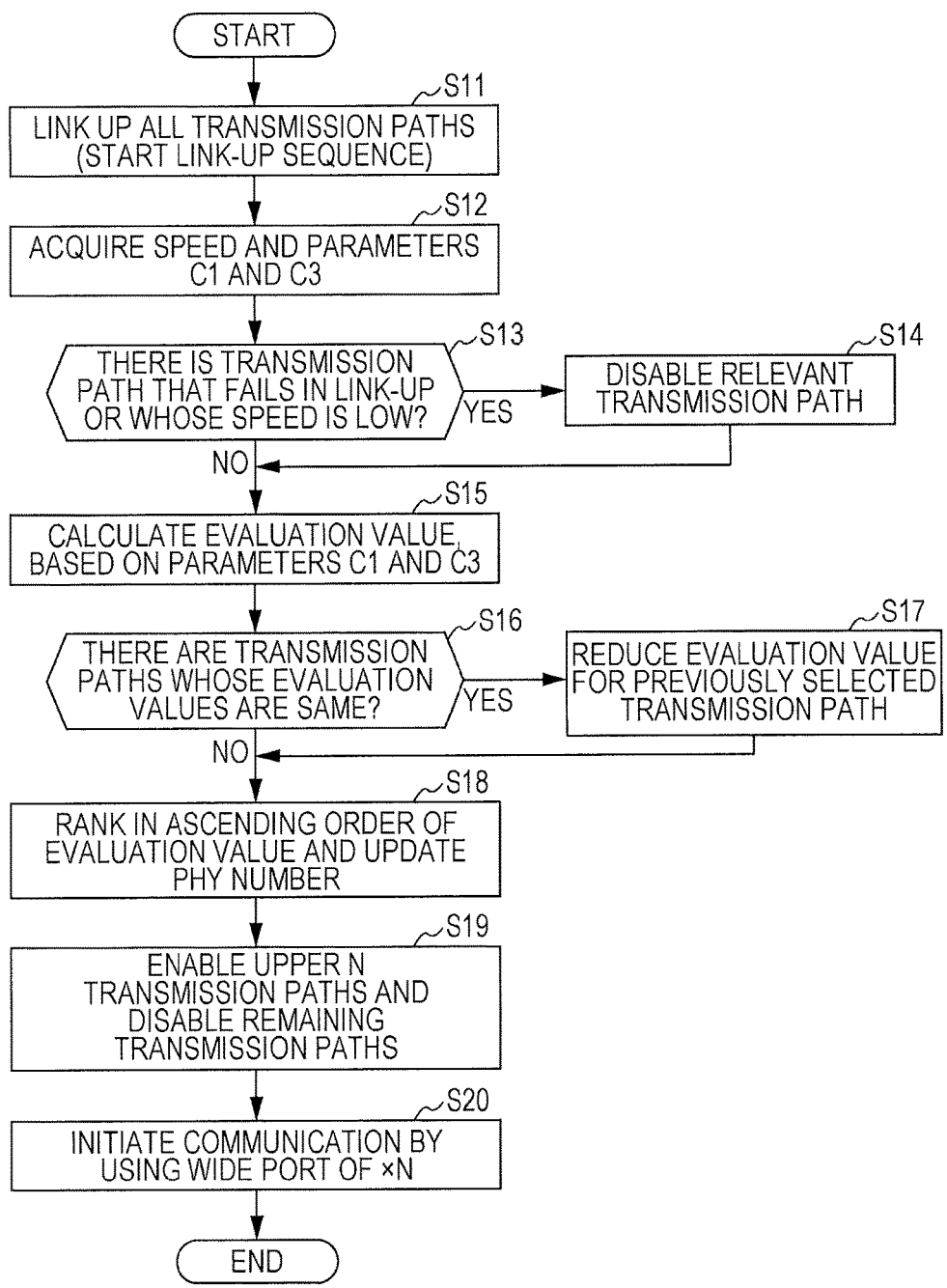
FIG. 12 is a flowchart illustrating an example of a processing procedure at the time of link-up.

Next, processing of the IO module 201 will be described using a flowchart. FIG. 12 is a flowchart illustrating an example of a processing procedure at the time of link-up.

Step S11

By resetting the transmitting and receiving circuits 210 corresponding to all transmission paths connected to the IO expansion module 202, the connection setting unit 252 causes these transmission paths to link up. Examples of the timing of resetting include a case where power supply for the DE 200 is activated and a case where the DE 200 is reset.

The reset transmitting and receiving circuits 210 each start a link-up sequence. By executing the link-up sequence, the transmitting and receiving circuits 210 each determine at least a communication speed at which it is possible to link up in a corresponding transmission path. Furthermore, in some cases, the transmitting and receiving circuits 210 each determine optimum values of the setting parameters of the Tx equalizer and the Rx equalizer. The content of processing of the link-up sequence will be described in detail in FIG. 13.

Step S12

The communication quality determination unit 251 acquires a communication speed that succeeds in link-up and the set parameters C1 and C3, from each of the transmitting and receiving circuits 210, in which execution of the link-up sequence is terminated. The communication quality determination unit 251 registers the values of the acquired communication speed and the acquired parameters C1 and C3, in the respective columns of the speed and the corresponding setting values of the determination table 261. Note that, in some cases, it is difficult to acquire the parameters C1 and C3 depending on a communication speed that succeeds in link-up.

Step S13

Based on information registered in the column of the speed of the determination table 261 in the step S12, the communication quality determination unit 251 determines whether there is a transmission path that fails in link-up or a transmission path that fails in link-up at 15 Gbps but succeeds in link-up at a speed lower than that. In a case where there is a transmission path that meets such a condition, a processing operation in a step S14 is performed, and in a case where there is no transmission path that meets such a condition, a processing operation in a step S15 is performed.

Step S14

The communication quality determination unit 251 registers "0" in the column of the EN flag of the determination table 261, which corresponds to the transmission path that fails in link-up or the transmission path that fails in link-up at 15 Gbps but succeeds in link-up at a speed lower than that, and the communication quality determination unit 251 disables the transmission path.

Note that in the description of FIG. 12 from this point forward, a transmission path other than the transmission path disabled in step S14 is called a "transmission path not disabled".

Step S15

For each of transmission paths not disabled, the communication quality determination unit 251 calculates, based on the parameters C1 and C3 acquired in the step S12, the evaluation value of the communication quality.

Step S16

The communication quality determination unit 251 determines whether, among transmission paths not disabled, there are transmission paths whose evaluation values calculated in the step S15 are the same. In a case where there are transmission paths whose evaluation values are the same, a processing operation in a step S17 is performed, and in a case where there are no transmission paths whose evaluation values are the same, a processing operation in a step S18 is performed.

Step S17

For a group of transmission paths whose evaluation values are the same, the communication quality determination unit 251 corrects the evaluation values in accordance with the following procedure. In a case where, among transmission paths within the group, there is a transmission path previously selected as a transmission path used for communication, the communication quality determination unit 251 reduces the evaluation value corresponding to that transmission path by a predetermined point.

Examples of a transmission path previously selected as a transmission path used for communication include a transmission path used for communication at the time of previous link-up. The communication quality determination unit 251 may determine, as the transmission path used for communication at the time of previous link-up, a transmission path in which "1" is registered in the column of, for example, the EN flag of the determination table 261 at the current moment.

In addition, as another method, a log in which information of a transmission path selected as a transmission path used for communication is recorded may be used. In a case where such a log is stored to the storage unit 260, the communication quality determination unit 251 may reference the log and select, as a transmission path whose evaluation value is to be reduced, a transmission path selected times greater than or equal to a predetermined number of times as a transmission path used for communication within, for example, the latest given period of time.

Step S18

The communication quality determination unit 251 assigns a rank order to each of transmission paths not disabled, in ascending order of evaluation value. Note that, in a case where correction of the evaluation value is performed in the step S17, an evaluation value after the correction is used. The communication quality determination unit 251 assigns the large PHY number to each of the transmission paths not disabled, in descending order of rank order (in other words, in ascending order of evaluation value), and updates the column of the corresponding PHY number in the determination table 261 in accordance with the assigned PHY number.

Note that, in this step S18, no PHY number is assigned to the transmission path disabled in the step S14. The transmission path to which no PHY number is assigned is not selected, as a transmission path for configuring the wide port, by the connection setting unit 252 during a time period until being linked up again and is not used for communication. In other words, in the step S14, the communication quality determination unit 251 disables in advance a transmission path in which it is difficult to link up at a speed greater than or equal to a desired communication speed, thereby causing a transmission path, in which it is possible to link up at a speed greater than or equal to the desired communication speed, to be preferably selected after communication id initiated.

Step S19

The connection setting unit 252 references the determination table 261 updated by the processing operations up to the step S18 and selects N transmission paths in descending order of PHY number. The connection setting unit 252 sets the EN flags corresponding to the selected transmission paths to "1" and enables the selected transmission paths. In addition, the connection setting unit 252 sets the EN flags corresponding to transmission paths other than those to "0" and disables these transmission paths.

Step S20

Using the wide port based on the N transmission paths and which are enabled in the step S19, the connection setting unit 252 initiates communication. In other words, the connection setting unit 252 performs transmission and reception of data via the transmitting and receiving circuits 210 corresponding to the enabled N transmission paths.

Figure 13:
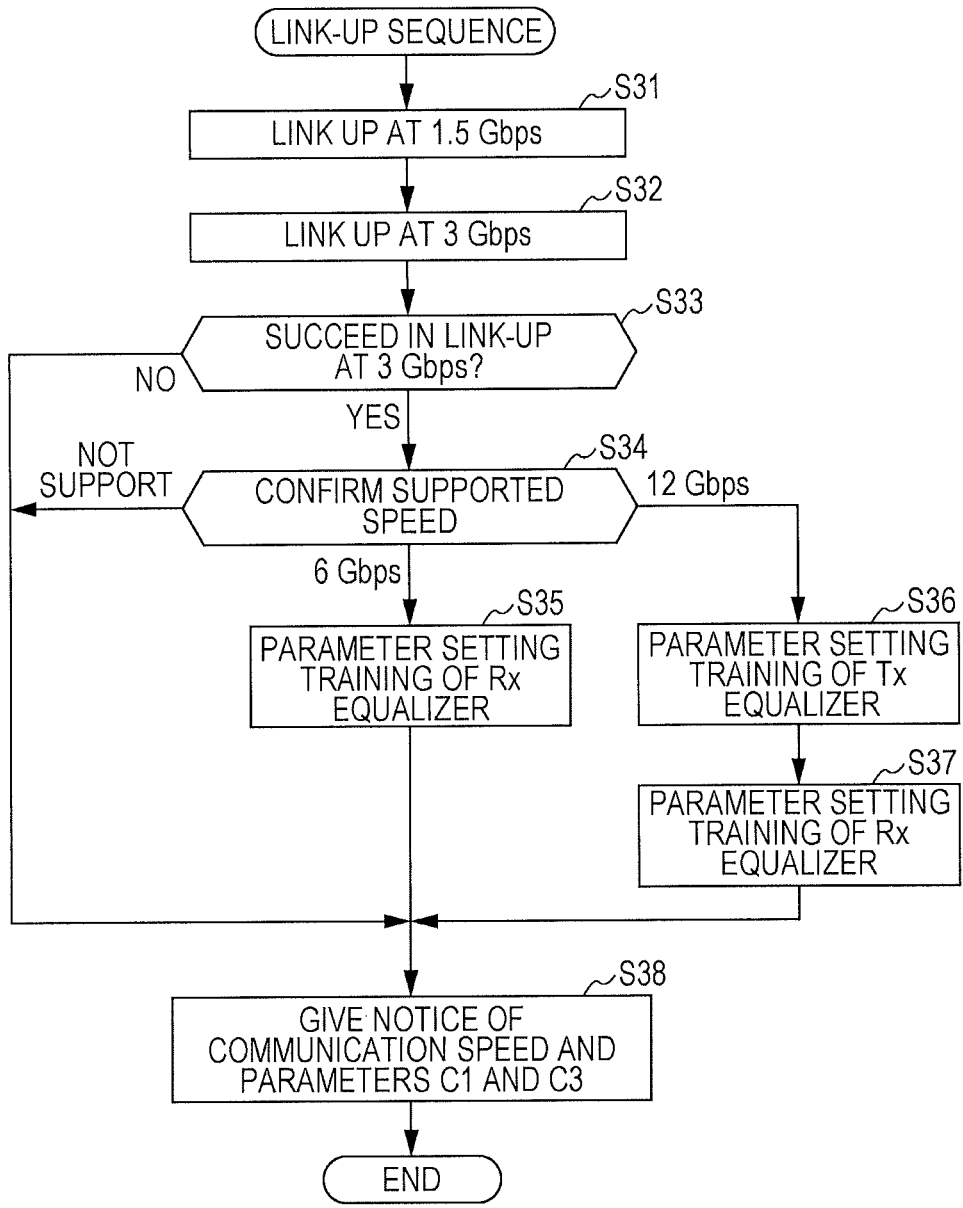
FIG. 13 is a flowchart illustrating an example of a processing procedure of a link-up sequence based on the transmitting and receiving circuit.

FIG. 13 is a flowchart illustrating an example of a processing procedure of a link-up sequence based on a transmitting and receiving circuit. Processing in FIG. 13 is performed in each of the transmitting and receiving circuits 210 reset in the step S11 in FIG. 12 by the connection setting unit 252.

Step S31

In the transmitting and receiving circuit 210, the control circuit 221 confirms whether it is possible to link up at 1.5 Gbps. The control circuit 221 causes the pattern generator 219 to output, for example, a test signal. The test signal is transmitted at a speed of 1.5 Gbps to a corresponding transmitting and receiving circuit (hereinafter, called "a transmitting and receiving circuit on an opposite side") in the IO expansion module 202 and it is determined whether it is possible for the test signal to be normally received by this transmitting and receiving circuit. In addition, the control circuit 221 receives a test signal transmitted from the transmitting and receiving circuit on an opposite side via the deserializer 217 and determines whether it is possible to normally receive the test signal.

Step S32

The control circuit 221 confirms whether it is possible to link up at 3 Gbps. The control circuit 221 causes the pattern generator 219 to output, for example, a test signal. The test signal is transmitted at a speed of 3 Gbps to the transmitting and receiving circuit on an opposite side and it is determined whether it is possible for the test signal to be normally received by this transmitting and receiving circuit. In addition, the control circuit 221 receives a test signal transmitted from the transmitting and receiving circuit on an opposite side via the deserializer 217 and determines whether it is possible to normally receive the test signal.

Step S33

The control circuit 221 determines whether succeeding in link-up in each of the steps S31 and S32. Here, in a case where succeeding in link-up at 3 Gbps in at least the step S32, a processing operation in a step S34 is performed. In addition, in a case where failing in link-up at 3 Gbps in the step S32, a processing operation in a step S38 is performed.

Step S34

Between the transmitting and receiving circuit 210 and a corresponding transmitting and receiving circuit in the IO expansion module 202, it is mutually confirmed whether communication at 6 Gbps is supported and whether communication at 12 Gbps is supported. This confirmation is performed based on a capability bit mutually transmitted to an opposite side.

The control circuit 221 adds, to the serializer 212, the value of the capability bit indicating that communication at 12 Gbps is supported. Such a test signal is received by the transmitting and receiving circuit on an opposite side and the transmitting and receiving circuit on an opposite side recognizes that the transmitting and receiving circuit 210 supports communication at 12 Gbps. In addition, the control circuit 221 receives a test signal transmitted from the transmitting and receiving circuit on an opposite side via the deserializer 217 and determines, based on the capability bit added to the received test signal, whether the transmitting and receiving circuit on an opposite side supports communication at 6 Gbps or 12 Gbps.

In a case where the transmitting and receiving circuit on an opposite side supports communication at 12 Gbps, a processing operation in a step S36 is performed. In a case where the transmitting and receiving circuit on an opposite side does not support communication at 12 Gbps while supporting communication at 6 Gbps, a processing operation in a step S35 is performed. In a case where the transmitting and receiving circuit on an opposite side supports none of communication at 6 Gbps and communication at 12 Gbps, a processing operation in the step S38 is performed.

The above-mentioned processing operations in the steps S31 to S34 correspond to the speed setting training regarding 1.5 Gbps and 3 Gbps. Subsequently, the parameter setting training is performed. The parameter setting training doubles as the speed setting training regarding 6 Gbps and 12 Gbps.

Step S35

The parameter setting training of the Rx equalizer is performed. The control circuit 221 causes the pattern generator 219 to output, for example, a test signal. The test signal is transmitted to the transmitting and receiving circuit on an opposite side and the transmitting and receiving circuit on an opposite side adjusts the parameters of the Rx equalizer provided in the transmitting and receiving circuit on an opposite side itself so that the waveform of a reception signal satisfies a predetermined condition. In a case where the adjustment of the parameters is terminated, a termination message is transmitted from the transmitting and receiving circuit on an opposite side. In addition, if a test signal is transmitted from the transmitting and receiving circuit on an opposite side, the control circuit 221 receives information indicating a state of a waveform from the waveform detection circuit 220 and adjusts parameters set in the Rx equalizer 215 so that the reception information satisfies a predetermined reference value.

In a case where the termination message is received from the transmitting and receiving circuit on an opposite side within a predetermined time period after starting of the training in the step S35 and the adjustment of the parameters set in the Rx equalizer 215 in the transmitting and receiving circuit 210 is terminated, the control circuit 221 determines that it is possible to link up at 6 Gbps.

Step S36

The parameter setting training of the Tx equalizer is performed. In this training, a negotiation is performed between the transmitting and receiving circuit 210 and the transmitting and receiving circuit on an opposite side, thereby determining the optimum values of the parameters C1 to C3 of the Tx equalizer. The parameter setting training of the Tx equalizer will be described in detail in FIG. 14.

Note that in a case where the training in the step S36 is not terminated within a predetermined time period, the control circuit 221 determines that it is difficult to link up at 12 Gbps. In this case, the processing makes a transition to the step S35 and the parameter setting training of the Rx equalizer at 6 Gbps is performed, thereby determining whether it is possible to link up at 6 Gbps.

Step S37

The parameter setting training of the Rx equalizer is performed. The content of this processing is the same as the step S35 except that the communication speed is 12 Gbps.

In a case where a termination message is received from the transmitting and receiving circuit on an opposite side within a predetermined time period after starting of the training in the step S37 and the adjustment of the parameters set in the Rx equalizer 215 in the transmitting and receiving circuit 210 is terminated, the control circuit 221 determines that it is possible to link up at 12 Gbps. On the other hand, in a case where it is determined that it is difficult to link up at 12 Gbps, the processing makes a transition to the step S35 and the parameter setting training of the Rx equalizer at 6 Gbps is performed, thereby determining whether it is possible to link up at 6 Gbps.

Step S38

The control circuit 221 notifies the communication quality determination unit 251 of a maximum communication speed at which it is possible to link up. In addition, in a case where it is possible to link up at 12 Gbps, the control circuit 221 notifies the communication quality determination unit 251 of the parameters C1 and C3 of the Tx equalizer 214, determined by the parameter setting training.

Figure 14:
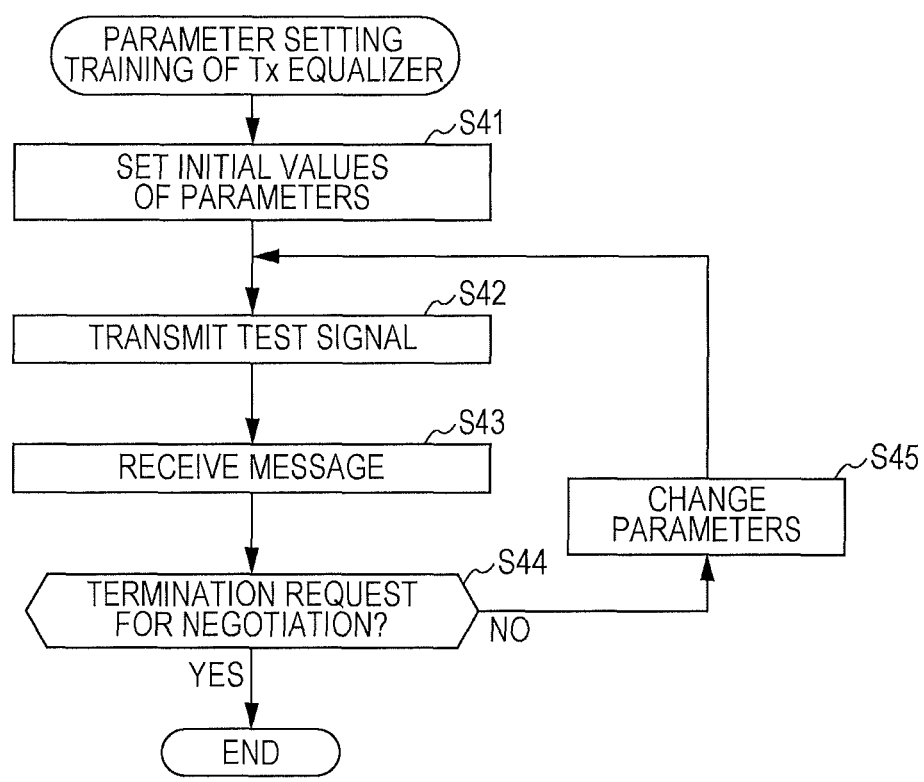
FIG. 14 is a flowchart illustrating an example of a processing procedure of parameter setting training of the Tx equalizer.

FIG. 14 is a flowchart illustrating an example of a processing procedure of the parameter setting training of the Tx equalizer. This processing in FIG. 14 corresponds to the processing operation in the step S36 in FIG. 13.

Step S41

For the Tx equalizer 214, the control circuit 221 sets predetermined initial values of the parameters C1 to C3.

Step S42

The control circuit 221 causes the pattern generator 219 to output a test signal. From this, the test signal is transmitted to the transmitting and receiving circuit on an opposite side.

Step S43

In the transmitting and receiving circuit on an opposite side, the waveform of the received test signal is evaluated and a message is sent back based on a result of the evaluation. As the message, there are an adjustment request message indicating whether each of the parameters C1 to C3 is to be incremented or decremented and a termination request message for terminating the training.

The control circuit 221 receives the message sent back from the transmitting and receiving circuit on an opposite side via the deserializer 217.

Step S44

The control circuit 221 determines the type of message received in the step S43. In a case where the received message is the adjustment request message, a processing operation in a step S45 is performed. In a case where the received message is the termination request message, the processing in FIG. 14 is terminated.

Step S45

Based on a content of the received adjustment request message, the control circuit 221 changes the parameters set in the Tx equalizer 214. In addition, the processing operations in and after the step S42 are performed again.

As described above, the negotiation is performed between the transmitting and receiving circuit 210 and the transmitting and receiving circuit on an opposite side, thereby determining the optimum values of the parameters C1 to C3 set in the Tx equalizer 214. Note that in a case where the termination request message is not received within a predetermined time period after starting of the training, the control circuit 221 determines failing in link-up at 12 Gbps. In this case, the processing makes a transition to the step S35 in FIG. 13 and the parameter setting training of the Rx equalizer at 6 Gbps is performed.

In addition, in FIG. 14, for ease of explanation, processing in a case where the transmitting and receiving circuit 210 is a transmitting side is only described. However, actually processing in which the processing in the transmitting and receiving circuit 210 and the processing in the transmitting and receiving circuit on an opposite side are replaced with each other is performed and adjustment of the parameters of the Tx equalizer in the transmitting and receiving circuit on an opposite side is performed. In this case, the control circuit 221 receives an evaluation result of a reception signal waveform from the waveform detection circuit 220 and transmits, based on the evaluation result, the adjustment request message or the termination request message to the transmitting and receiving circuit on an opposite side. In addition, in a case where the evaluation result of the waveform does not satisfy a predetermined condition within a predetermined time period and it is difficult to transmit the termination request message, the control circuit 221 determines failing in link-up at 12 Gbps.

By the way, while, in the above-mentioned FIG. 12, the communication quality is determined based on the parameters C1 and C3 of the Tx equalizer 214, a value other than these may be used as a value used for determining the communication quality. For example, a parameter of the Rx equalizer may be used. The following FIG. 15 illustrates an example in which the processing in FIG. 12 is modified so that the communication quality is determined using a parameter Cr of the Rx equalizer in the transmitting and receiving circuit on an opposite side in addition to the parameters C1 and C3 of the Tx equalizer 214.

Figure 15:
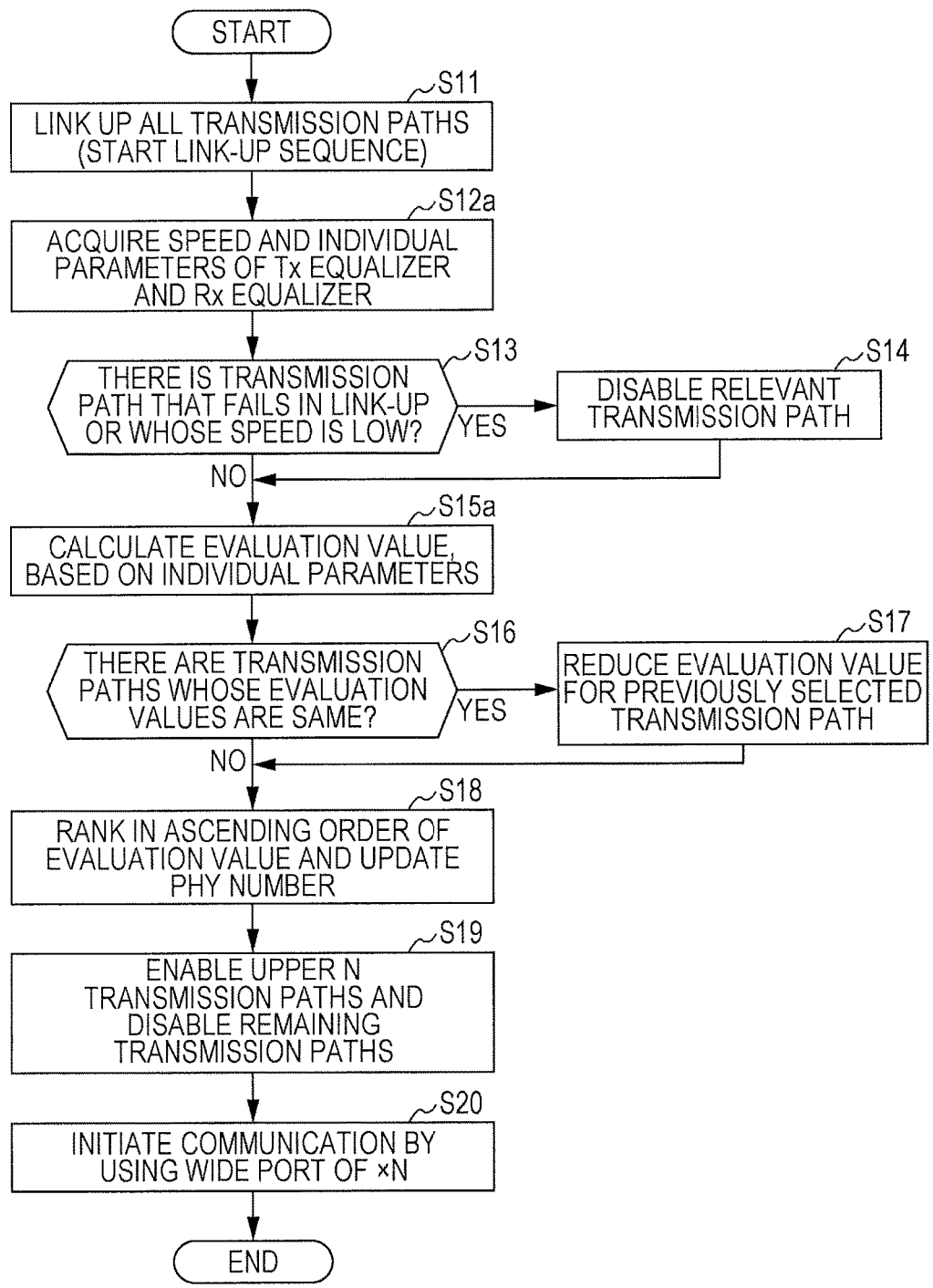
FIG. 15 is a flowchart illustrating an example of a modification to the processing procedure at the time of link-up.

FIG. 15 is a flowchart illustrating an example of a modification to the processing procedure at the time of link-up. In FIG. 15, the same symbol is assigned to a processing step whose content is the same as in FIG. 12 and the description thereof will be omitted.

In processing in FIG. 15, the steps S12 and S15 in FIG. 12 are replaced with steps S12$a$ and S15$a$, respectively.

Step S12$a$

In a case of succeeding in link-up at 12 Gbps by performing a link-up sequence, the control circuit 221 in each of the transmitting and receiving circuits 210 in the IO module 201 acquires, from the transmitting and receiving circuit on an opposite side, the parameter Cr set in the Rx equalizer in the transmitting and receiving circuit on an opposite side.

The communication quality determination unit 251 acquires, from each of the transmitting and receiving circuits 210, a communication speed that succeeds in link-up. In addition, the communication quality determination unit 251 acquires the parameters C1, C3, and Cr set for a corresponding transmission path from the transmitting and receiving circuit 210 that succeeds in link-up at 12 Gbps. The communication quality determination unit 251 registers the values of the acquired communication speed and the acquired parameters C1, C3, and Cr in the respective columns of the speed and the corresponding setting values of the determination table 261. Note that while not illustrated, in a case of the present example of a modification, the column of a setting value regarding the parameter Cr is added to the determination table 261.

Step S15$a$

For each of transmission paths not disabled, the communication quality determination unit 251 calculates, based on the parameters C1, C3, and Cr acquired in the step S12$a$, the evaluation value of the communication quality. The evaluation value YP of the communication quality in the Pth transmission path is calculated using, for example, the following Expression (2).

$$YP = \alpha \cdot C1P + \beta \cdot C3P + \gamma \cdot CrP \text{ (where, } \alpha < \beta, \gamma < \beta) \quad (2)$$

In Expression (2), the CrP indicates the setting value of the parameter Cr in the transmitting and receiving circuit on an opposite side connected to the transmitting and receiving circuit 210 corresponding to the Pth transmission path. In addition, the $\gamma$ is a weighting coefficient for the parameter Cr. The reason why $\gamma < \beta$ is set is that in general the adjustment amount of pre-emphasis on a transmitting side has a strong correlation with the communication quality, compared with the adjustment amount of a waveform shape in the Rx equalizer. According to Expression (2), in the same way as in Expression (1), it is determined that the communication quality increases with a decrease in the calculated evaluation value.

Note that while, in the above-mentioned example in FIG. 15, the parameter Cr set in the Rx equalizer in the transmitting and receiving circuit on an opposite side is used, a parameter Cr set in, for example, the Rx equalizer in the transmitting and receiving circuit 210 may be used. In a case of any of these, the communication quality of a transmission path is determined using the parameter Cr of the Rx equalizer in addition to the parameters C1 and C3 of the Tx equalizer, thereby enabling determination accuracy of the communication quality to be improved.

Figure 16:
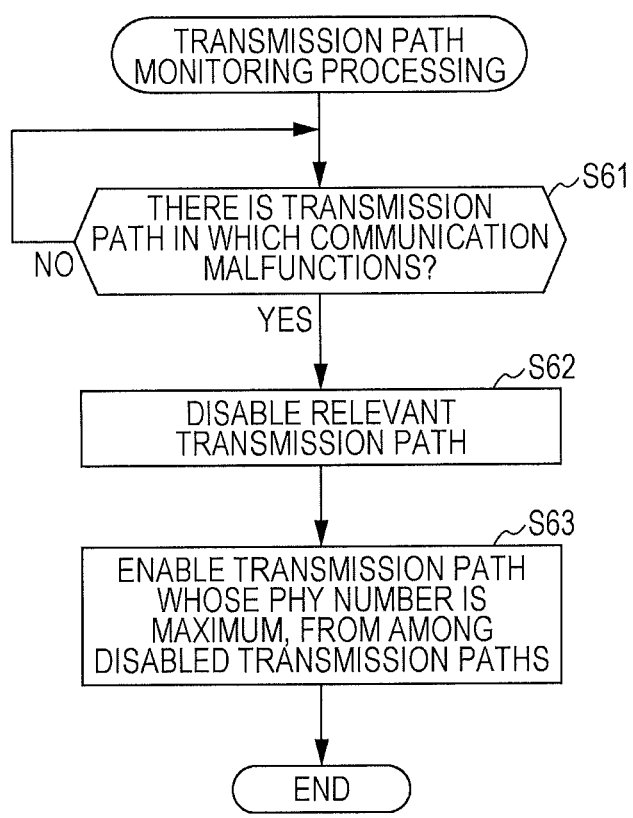
FIG. 16 is a flowchart illustrating an example of a procedure of transmission path monitoring processing.

Next, FIG. 16 is a flowchart illustrating an example of a procedure of transmission path monitoring processing. The processing in FIG. 15 is performed in the expander chip 201$a$ in the IO module 201 after communication is initiated in the step S20 in FIG. 12 or FIG. 15.

Step S61

The communication quality determination unit 251 monitors a transmission state of each of enabled transmission paths. If the communication quality determination unit 251 detects a transmission path in which communication malfunctions owing to, for example, a state in which the BER is reduced to a level less than or equal to a predetermined value or link-down occurs, a processing operation in a step S62 is performed.

Step S62

By updating the EN flag of the determination table 261, which corresponds to the transmission path in which a malfunction of communication is detected, to "0", the connection setting unit 252 disables the transmission path.

Step S63

The connection setting unit 252 references the determination table 261 and selects a transmission path whose PHY number is a maximum, from among transmission paths, whose EN flags are "0", other than the transmission paths disabled in the step S62. The connection setting unit 252 enables the EN flag corresponding to the selected transmission path by updating the EN flag to "1" and configures the wide port by using this transmission path and other already enabled (N−1) transmission paths, thereby continuing communication.

As described above, the PHY numbers are assigned to the transmitting and receiving circuits 210 corresponding to the respective transmission paths in order of communication quality determined at the time of link-up and the assigned PHY numbers are held in the determination table 261. Based on such a configuration, in a case where a transmission path in which communication malfunctions is detected after communication is initiated as illustrated in FIG. 16, it is possible to easily select a transmission path whose communication quality is considered to be a maximum, from among disabled redundant transmission paths. In addition, by replacing, with the selected transmission path, the transmission path in which communication malfunctions, it is possible to resume communication in a short period of time.

In the second embodiment describes above, the respective expander chips in the IO module 201 and the IO expansion module 202 are physically connected to each other using M transmission paths more than N and which configure the wide port. In addition, from among the M transmission paths, N transmission paths are selected in descending order of communication quality and communication is initiated using the selected N transmission paths. From this, even in a case where low-cost circuit boards are used as printed-circuit boards in which the individual expander chips are implemented or circuit boards in which transmission paths between the expander chips are implemented, a probability that it is possible to stably perform communication at a speed greater than or equal to a desired speed between the individual expander chips is increased. In other words, according to the second embodiment, while reducing manufacturing costs of the DE 200, the possibility of the decreased communication speed therewith may be reduced.

Note that while, in the above-mentioned second embodiment, a configuration relating to communication between the IO module 201 and the IO expansion module 202 is described, the same configuration as described above may be applied as a configuration relating to communication between the IO module 201 and the IO expansion module 203.

In addition, communication between, for example, a SAS controller chip included in the IOC 305 in the CM 300*a* and the expander chip 201*a* included in the IO module 201 in the DE 200 may be performed in the same way as communication between the respective expander chips in the IO module 201 and the IO expansion module 202. At least one of, for example, the SAS controller chip in the IOC 305 and the expander chip 201*a* in the IO module 201 is implemented in a low-cost printed-circuit board in some cases. Alternatively, in a case where the IOC 305 and the IO module 201 are connected to each other by a printed-circuit board called a backplane, a low-cost printed-circuit board is used as the printed-circuit board in some cases. In these cases, there is a possibility that it becomes difficult to perform communication at a speed greater than or equal to a desired speed between the IOC 305 and the IO module 201.

Here, it is assumed that a wide port utilizing N transmission paths (physical links) is configured between the SAS controller chip in the IOC 305 and the expander chip in the IO module 201. In this case, the SAS controller chip in the IOC 305 and the expander chip in the IO module 201 are physically connected to each other using transmission paths more than N. In addition, functions corresponding to the above-mentioned communication quality determination unit 251 and connection setting unit 252 are realized by a CPU within the SAS controller chip in the IOC 305. In addition, at the time of link-up, the SAS controller chip in the IOC 305 selects N transmission paths in descending order of communication quality from among the connected transmission paths and configures the wide port by using the selected N transmission paths, thereby initiating communication with the expander chip 201*a* in the IO module 201. From this, there is an increased possibility of stably performing communication at a speed greater than or equal to a desired speed between the SAS controller chip in the IOC 305 and the expander chip in the IO module 201.

In addition, functions corresponding to the above-mentioned communication quality determination unit 251 and connection setting unit 252 may be realized by the CPU 301 in the CM 300*a* in place of the CPU within the IOC 305. In this case, the CPU 301 executes a predetermined program, thereby realizing processing operations corresponding to the communication quality determination unit 251 and the connection setting unit 252.

Furthermore, the configuration relating to communication between the SAS expander chips illustrated in the second embodiment may be applied to a configuration regarding communication between PCIe controller chips connected via a PCIe bus. The technology of the second embodiment may be applied to respective PCIe controller chips included in, for example, the PCIe switch 303 in the CM 300*a* and a PCIe switch in the CM 300*b* on the other side.

In the PCIe, the physical link in the above description is called a "lane". In addition, a method for performing communication by using lanes as one logical communication port is specified. Therefore, by associating the physical links (transmission paths) in the above description with the lanes, in communication via the PCIe bus, the same connection configuration and the same selection processing for lanes as those of the second embodiment are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device comprising:
   a first transmitting and receiving circuit configured to be connected to a second transmitting and receiving circuit via a first number of transmission paths, where the first number is greater than or equal to two;
   a memory, and
   a processor coupled to the memory and the first transmitting and receiving circuit and configured to:
   determine, at a time of initiating communication with the second transmitting and receiving circuit, a value of a setting parameter of a signal transmission characteristic in each of the first number of the transmission paths by performing a negotiation with the second transmitting and receiving circuit;
   determine communication quality in each of the first number of the transmission paths based on the value of the setting parameter that is determined by the negotiation; and
   select a second number of transmission paths, where the second number is less than the first number, in descending order of the communication quality from among the first number of the transmission paths, thereby causing the first transmitting and receiving circuit to perform communication by using the second number of the transmission paths.

2. The electronic device according to claim 1, wherein the setting parameter indicates a correction amount for correcting a waveform of a signal transmitted via a corresponding transmission path, and
   the communication quality in the corresponding transmission path increases with a decrease in the correction amount indicated by the setting parameter.

3. The electronic device according to claim 1, wherein based on the setting parameter that is determined by the negotiation and that corresponds to each of the first number of the transmission paths and a reception setting parameter regarding a signal reception characteristic in the second transmitting and receiving circuit in each of the first number of the transmission paths, the communication quality in each of the first number of the transmission paths is determined.

4. The electronic device according to claim 1, wherein at the time of initiating communication with the second transmitting and receiving circuit, a transmission path via which it is difficult to perform communication with the second transmitting and receiving circuit at a speed greater than or equal to a predetermined speed is excluded from among the first number of the transmission paths and the second number of the transmission paths are selected in descending order of communication quality from among remaining transmission paths.

5. The electronic device according to claim 1, wherein the processor further configured to:

record, in the memory, rank order information indicating a rank order of the communication quality regarding each of the first number of the transmission paths, and in a case of detecting a malfunction of communication in a first transmission path out of the selected second number of the transmission paths after initiating communication by using the selected second number of the transmission paths, select a second transmission path whose communication quality is maximum from among remaining transmission paths other than the selected second number of the transmission paths, thereby performing the communication by using the second transmission path in place of the first transmission path.

6. A communication control circuit comprising:

a transmitting and receiving circuit configured to be connected to a communication control circuit via a first number of transmission paths where the first number is greater than or equal to two;

a memory, and a processor coupled to the memory and the transmitting and receiving circuit and configured to:

determine, at a time of initiating communication with the communication control circuit, a value of a setting parameter of a signal transmission characteristic in each of the first number of the transmission paths by performing a negotiation with the communication control circuit;

determine communication quality in each of the first number of the transmission paths based on the value of the setting parameter that is determined by the negotiation; and select a second number of the transmission paths, where the second number is less than the first number, in descending order of the communication quality from among the first number of the transmission paths, thereby causing the transmitting and receiving circuit to perform communication by using the second number of the transmission paths.

7. A communication control method comprising:

determining, at a time of causing a first communication circuit included in an electronic device to initiate communication with a second communication circuit in a second electronic device, the first electronic device being connected to the second communication circuit via a first number of the transmission paths, a value of a setting parameter of a signal transmission characteristic in each of the first number of the transmission paths by performing a negotiation with the second communication circuit;

determining communication quality in each of the first number of transmission paths, where the first number is greater than or equal to two, based on the value of the setting parameter that is determined by the negotiation; and selecting a second number of the transmission paths, where the second number is less than the first number, in descending order of the communication quality from among the first number of the transmission paths, thereby causing the first communication circuit to perform communication by using the second number of the transmission paths.

8. The communication control method according to claim 7, wherein the setting parameter indicates a correction amount for correcting a waveform of a signal transmitted via a corresponding transmission path, and in the determining communication quality, determining that the communication quality in the corresponding transmission path increases with a decrease in the correction amount indicated by the setting parameter.

9. The communication control method according to claim 7, wherein in the determining, determining the communication quality in each of the first number of the transmission paths based on the setting parameter that is determined by the negotiation and that corresponds to each of the first number of the transmission paths and a reception setting parameter regarding a signal reception characteristic in the other-second communication circuit in each of the first number of the transmission paths.

10. The communication control method according to claim 7, wherein in the selecting, excluding, from among the first number of the transmission paths, a transmission path via which it is difficult to perform communication with the second communication circuit at a speed greater than or equal to a predetermined speed and selecting the second number of the transmission paths in descending order of communication quality from among remaining transmission paths.

11. The communication control method according to claim 7, further comprising:

causing the first electronic device to record, to a storage unit, rank order information indicating a rank order of the communication quality regarding each of the first number of the transmission paths; and in a case of detecting a malfunction of communication in a first transmission path out of the second number of the transmission paths after causing the first communication circuit to initiate communication by using the selected second number of the transmission paths, causing the first electronic device to select, based on the rank order information, a second transmission path whose communication quality is maximum from among remaining transmission paths other than the selected second number of the transmission paths, thereby causing the first communication circuit to perform communication by using the second transmission path in place of the first transmission path.

* * * * *